US007766732B2

(12) United States Patent
Hauville

(10) Patent No.: US 7,766,732 B2
(45) Date of Patent: Aug. 3, 2010

(54) DUCTLESS FUMEHOOD SYSTEM

(75) Inventor: Francois P. Hauville, North Andover, MA (US)

(73) Assignee: FIPAK Research and Development Company, Rowley, MA (US)

( * ) Notice: Subject to any disclaimer, the term of this patent is extended or adjusted under 35 U.S.C. 154(b) by 0 days.

(21) Appl. No.: 11/821,634

(22) Filed: Jun. 25, 2007

(65) Prior Publication Data

US 2008/0072763 A1 Mar. 27, 2008

Related U.S. Application Data

(60) Provisional application No. 60/816,211, filed on Jun. 23, 2006.

(51) Int. Cl.
*F23J 11/00* (2006.01)
*B01D 50/00* (2006.01)

(52) U.S. Cl. ............................ 454/56; 454/61; 454/62; 55/385.2

(58) Field of Classification Search .................. 454/56, 454/61, 62
See application file for complete search history.

(56) References Cited

U.S. PATENT DOCUMENTS 4,805,722 A * 2/1989 Keating et al. .............. 180/287
4,946,480 A * 8/1990 Hauville .................... 96/117.5
5,438,226 A * 8/1995 Kuchta ....................... 307/125
5,439,414 A * 8/1995 Jacob .......................... 454/61
5,764,579 A * 6/1998 McMasters et al. ............ 700/2
6,579,169 B1 * 6/2003 Demark ...................... 454/208
6,920,874 B1 * 7/2005 Siegel .................... 126/299 R
2007/0042696 A1 * 2/2007 Casey .......................... 454/49
2007/0105494 A1 * 5/2007 Lin ............................ 454/299

* cited by examiner

*Primary Examiner*—Steve McAllister
*Assistant Examiner*—Helena Kosanovic
(74) *Attorney, Agent, or Firm*—Pandiscio & Pandiscio

(57) ABSTRACT

A ductless fumehood system comprising: at least one ductless fumehood comprising a housing; a workspace formed within the housing; a door for selectively closing off the workspace; an air inlet for introducing air into the workspace; a master module for receiving air from the workspace, purging unwanted substances from that air, and then exhausting that filtered air to the ambient room atmosphere; and a slave module for receiving air from the workspace, purging unwanted substances from that air, and then exhausting that filtered air to the ambient room atmosphere; wherein the slave module is in communication with the master module such that the master module central processing unit is capable of (i) controlling the operation of the active elements of the slave module, (ii) detecting a function failure of the slave module, and (iii) activating the master module alarm in the event of a failure within that slave module.

16 Claims, 8 Drawing Sheets

The ValiQuest® questionaire

A free service offered by the erlab® group to validate and approve the chemical handlings to be performed in the captair® ductless fume hoods.

The erlab® laboratory will establish the correct ductless fume hood for you, the appropriate filter type and the means of determining filter saturation for your unique chemical handlings.

(A) - Indicate the chemical handled.
If the name of the product is a trade name, it is necessary to send us the material safety data sheet (MSDS) with the questionaire.

(B) - Indicate the container used the most frequently from the list below:
Separating funnel, funnel, air dryer, tank, washing tank, bath, flask, drum, beaker, Petri dish, glass jar, bottle, capsule, evaporating dish, decanter, cell, impregnated cloth, fraction collector, column, chromatography column, cup, crucible, crystallizing dish, tank, spectroscopy cuvette, ultrasonic tank, cuvette, desiccator, dispenser, funnel, test tube. Erlenmeyer flask, evaporator, sink, flask, filtering flask, Soxhlet extraction, filteration, filter flask with tubulure, volumetric flask, flask jar, slides, micropipette, microsyringe, microtube, weighting boat, paper, pipette, wash bottle, plate, culture plate, flat dish, crucible, atomizer, syringe, spray, cup, thermocycler, vial, watch glass, etc.

(C) indicate if the container is opened or closed during the handling.

(D) - Indicate a mass concentration in %
(within the list of chemicals, do not forget to indicate the organic solvents used). If the chemical is pure, indicate 100%; of it is very diluted 1%; otherwise indicate the closest percentage.

(E) - Expressed in °C.
For room temperature, indicate 22°C.

(F) applications/month
frequencies to be considered:

| | |
|---|---|
| < 1 /month, | 31 to 50 /month, |
| 2 to 3 /month, | 51 to 100 /month, |
| 3 to 4 /month, | > 100 /month. |
| 5 to 10 /month, | |
| 11 to 20 /month, | |
| 21 to 30 /month. | |

(G) in ml or g.
Indicate the average quantity of chemical used per handling cycle (in ml for liquids and grams for solids).
Scale of values:

| | |
|---|---|
| 0 to 5 ml (or g), | 151 to 250 ml (or g), |
| 6 to 10 ml (or g), | 251 to 500 ml (or g), |
| 11 to 25 ml (or g), | 501 to 1000 ml (or g), |
| 26 to 50 ml (or g), | > 1 Liter (or kg) |
| 51 to 75 ml (or g). | |

(H) Scale of values to be used:

| | |
|---|---|
| 0 to 2 minutes, | 46 to 60 minutes, |
| 3 to 5 minutes, | 61 to 90 minutes, |
| 6 to 10 minutes, | 91 to 150 minutes, |
| 11 to 20 minutes, | 151 to 320 minutes, |
| 21 to 30 minutes, | < 320 minutes. |
| 31 to 45 minutes, | |

(I) Stirring, analysis, DNA amplification, etching, autoclave, oil bath, dry bath, sand bath, water bath, Bunsen burner, grinding, calcination, ashes, centrifugation, heating, hot air bath, combinatorial chemistry, thin-layer chromatography, chromatography/paper chromatography, gas chromatography, liquid chromatography, staining, colorimetry, concentration, conductimetry, conductivity, cryogenics, culture, thin-layer chromatography tank, biochemical oxygen demand, chemical oxygen demand, specific gravity, drying, dialysis, digestion, dilution, proportioning, electrophoresis, inoculator, evaporation, extraction, filtration, flocculation, fluxing, muffle furnace, etching, histology, HPLC, Karl Fischer, Kjeidahl, washing, percolation, mixing, suspended solids, microscopy, microtiter, mineralization, suspended volatile matters, cleaning, oxydation-reduction, weighting, pH-metry, photometry, pipetting, flash point, fusion point, sampling, preparation phase, rinsing, drying, welding, spectrometry, sieving, titration, transfer, soaking, turbidity, viscosity, etc.

FIG. 4

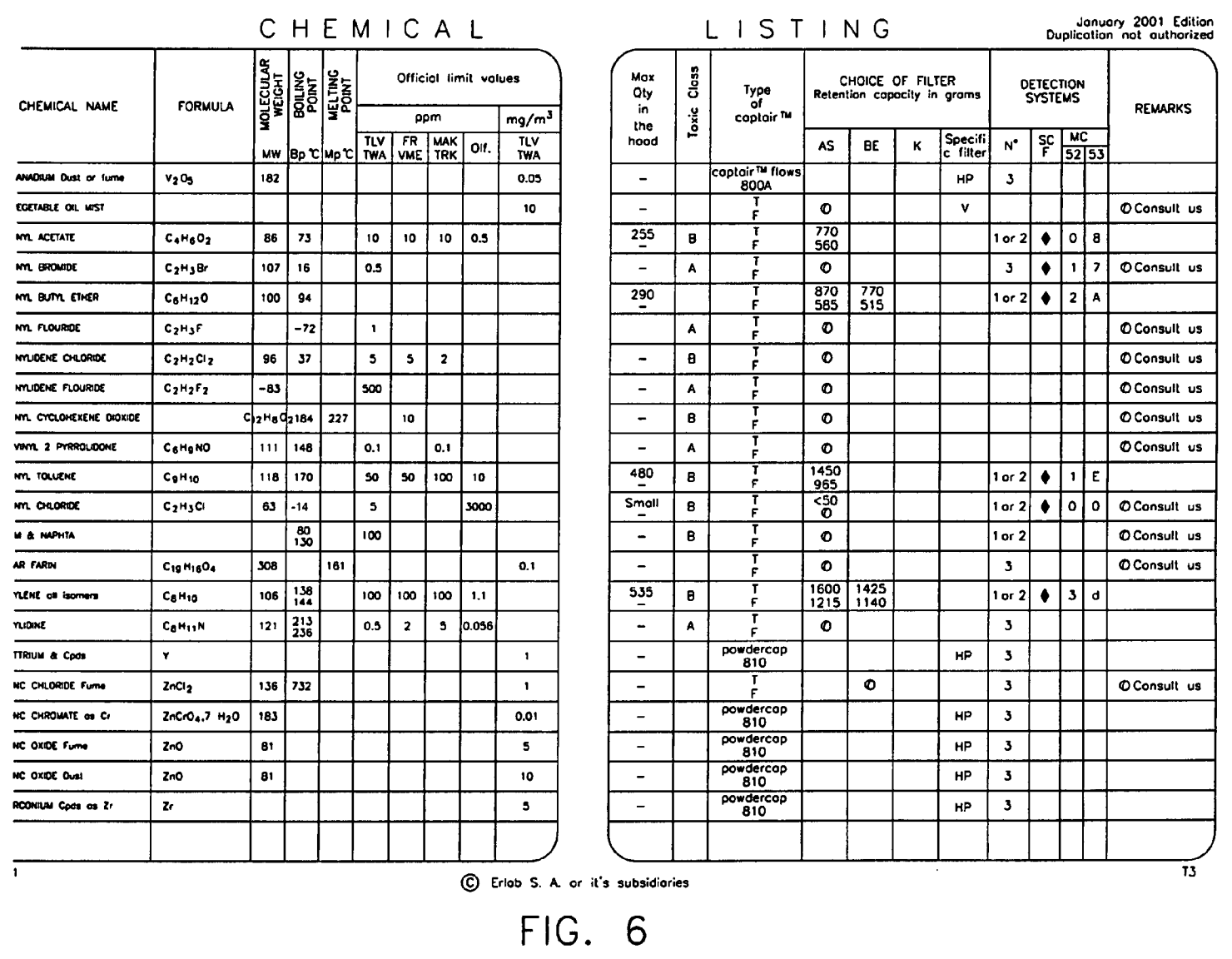

CHEMICAL LISTING

January 2001 Edition
Duplication not authorized

| CHEMICAL NAME | FORMULA | MOLECULAR WEIGHT MW | BOILING POINT Bp °C | MELTING POINT Mp °C | Official limit values ppm TLV TWA | ppm FR VME | ppm MAK TRK | ppm Olf. | mg/m³ TLV TWA |
|---|---|---|---|---|---|---|---|---|---|
| ANADIUM Dust or fume | $V_2O_5$ | 182 | | | | | | | 0.05 |
| EGETABLE OIL MIST | | | | | | | | | 10 |
| NYL ACETATE | $C_4H_6O_2$ | 86 | 73 | | 10 | 10 | 10 | 0.5 | |
| NYL BROMIDE | $C_2H_3Br$ | 107 | 16 | | 0.5 | | | | |
| NYL BUTYL ETHER | $C_6H_{12}O$ | 100 | 94 | | | | | | |
| NYL FLOURIDE | $C_2H_3F$ | | -72 | | 1 | | | | |
| NYLIDENE CHLORIDE | $C_2H_2Cl_2$ | 96 | 37 | | 5 | 5 | 2 | | |
| NYLIDENE FLOURIDE | $C_2H_2F_2$ | -83 | | | 500 | | | | |
| NYL CYCLOHEXENE DIOXIDE | $C_{12}H_8O_2$ | | 184 | 227 | | 10 | | | |
| VINYL 2 PYRROLIDONE | $C_6H_9NO$ | 111 | 148 | | 0.1 | | 0.1 | | |
| NYL TOLUENE | $C_9H_{10}$ | 118 | 170 | | 50 | 50 | 100 | 10 | |
| NYL CHLORIDE | $C_2H_3Cl$ | 63 | -14 | | 5 | | | 3000 | |
| M & NAPHTA | | | 80<br>130 | | 100 | | | | |
| AR FARIN | $C_{19}H_{16}O_4$ | 308 | | 161 | | | | | 0.1 |
| YLENE all isomers | $C_8H_{10}$ | 106 | 138<br>144 | | 100 | 100 | 100 | 1.1 | |
| YLIDINE | $C_8H_{11}N$ | 121 | 213<br>236 | | 0.5 | 2 | 5 | 0.056 | |
| TTRIUM & Cpds | Y | | | | | | | | 1 |
| NC CHLORIDE Fume | $ZnCl_2$ | 136 | 732 | | | | | | 1 |
| NC CHROMATE as Cr | $ZnCrO_4.7\ H_2O$ | 183 | | | | | | | 0.01 |
| NC OXIDE Fume | ZnO | 81 | | | | | | | 5 |
| NC OXIDE Dust | ZnO | 81 | | | | | | | 10 |
| RCONIUM Cpds as Zr | Zr | | | | | | | | 5 |

| CHEMICAL NAME | Max Qty in the hood | Toxic Class | Type of captair™ | CHOICE OF FILTER Retention capacity in grams AS | BE | K | Specific filter | DETECTION SYSTEMS N° | SC F | MC 52 | MC 53 | REMARKS |
|---|---|---|---|---|---|---|---|---|---|---|---|---|
| ANADIUM Dust or fume | – | | captair™ flows 800A | | | | HP | 3 | | | | |
| EGETABLE OIL MIST | – | | T F | Ø | | | V | | | | | Ø Consult us |
| NYL ACETATE | 255 – | B | T F | 770<br>560 | | | | 1 or 2 | ◆ | 0 | 8 | |
| NYL BROMIDE | – | A | T F | Ø | | | | 3 | ◆ | 1 | 7 | Ø Consult us |
| NYL BUTYL ETHER | 290 – | | T F | 870<br>585 | 770<br>515 | | | 1 or 2 | ◆ | 2 | A | |
| NYL FLOURIDE | | A | T F | Ø | | | | | | | | Ø Consult us |
| NYLIDENE CHLORIDE | – | B | T F | Ø | | | | | | | | Ø Consult us |
| NYLIDENE FLOURIDE | – | A | T F | Ø | | | | | | | | Ø Consult us |
| NYL CYCLOHEXENE DIOXIDE | – | B | T F | Ø | | | | | | | | Ø Consult us |
| VINYL 2 PYRROLIDONE | – | A | T F | Ø | | | | | | | | Ø Consult us |
| NYL TOLUENE | 480 – | B | T F | 1450<br>965 | | | | 1 or 2 | ◆ | 1 | E | |
| NYL CHLORIDE | Small – | B | T F | <50<br>Ø | | | | 1 or 2 | ◆ | 0 | 0 | Ø Consult us |
| M & NAPHTA | – | B | T F | Ø | | | | 1 or 2 | | | | Ø Consult us |
| AR FARIN | – | | T F | Ø | | | | 3 | | | | Ø Consult us |
| YLENE all isomers | 535 – | B | T F | 1600<br>1215 | 1425<br>1140 | | | 1 or 2 | ◆ | 3 | d | |
| YLIDINE | – | A | T F | Ø | | | | 3 | | | | |
| TTRIUM & Cpds | – | | powdercap 810 | | | | HP | 3 | | | | |
| NC CHLORIDE Fume | – | | T F | | Ø | | | 3 | | | | Ø Consult us |
| NC CHROMATE as Cr | – | | powdercap 810 | | | | HP | 3 | | | | |
| NC OXIDE Fume | – | | powdercap 810 | | | | HP | 3 | | | | |
| NC OXIDE Dust | – | | powdercap 810 | | | | HP | 3 | | | | |
| RCONIUM Cpds as Zr | – | | powdercap 810 | | | | HP | 3 | | | | |

1 T3

© Erlab S. A. or it's subsidiaries

FIG. 6

DUCTLESS FUMEHOOD SYSTEM

REFERENCE TO PENDING PRIOR PATENT APPLICATION

This patent application claims benefit of pending prior U.S. Provisional Patent Application Ser. No. 60/816,211, filed Jun. 23, 2006 by Francois P. Hauville for MODULAR FILTRATION SYSTEM WITHOUT DUCTING, AND EQUIPPED WITH A MANAGEMENT SYSTEM COMPRISING A REMOTE INTERCOMMUNICATION SYSTEM DESIGNED TO ENSURE THE SAFE USE OF DUCTLESS FILTERING FUME HOODS, PRIMARILY IN A LABORATORY SETTING, which patent application is hereby incorporated herein by reference.

FIELD OF THE INVENTION

This invention relates to air filtration systems in general, and more particularly to ductless fumehoods for purging hazardous substances from the air.

BACKGROUND OF THE INVENTION

Air filtration systems are used in many situations to purge unwanted substances from the air. Such air filtration systems generally exist in a variety of forms, depending upon their use and function.

One type of air filtration system is the ductless fumehood. Ductless fumehoods provide a protected enclosure for isolating a workspace from an ambient atmosphere, in order that dangerous substances may be handled safely in the workspace without endangering nearby personnel and the surrounding environment.

More particularly, and looking now at FIG. 1, there is shown a typical prior art ductless fumehood 5. Ductless fumehood 5 generally comprises an enclosed workspace 10 accessed by a front door 15, with front door 15 engaging a sash 20 when the enclosed workspace is "sealed". An air inlet 25 admits ambient air into enclosed workspace 10, and an air outlet 30 removes air from enclosed workspace 10. Air from air outlet 30 is passed through a filter 35 before being released to the ambient air (e.g., the room air within a laboratory). Filter 35 removes hazardous substances from the air, thereby rendering the air safe before it is vented to the ambient air. An outlet fan 40 is generally provided at air outlet 30 so as to keep enclosed workspace 10 at a negative pressure differential relative to the ambient air, in order to ensure that any air within the enclosed workspace passes through filter 35 before being vented to the ambient air. A sensor 45 is generally provided at the outlet of filter 35 so as to ensure that the filter purges any hazardous substances from the workspace air before that air is then vented to the ambient air. Outlet fan 40 and sensor 45 are generally connected to an alarm 50 which can alert the operator in the event that outlet fan 40 and/or sensor 45 fail.

Ductless fumehoods have become popular due to their technical effectiveness, low acquisition and implementation costs, rapid installation, and substantial energy savings. More particularly, with proper filter selection, ductless fumehoods can be extremely effective in removing hazardous materials from the air. Furthermore, due to their simple design and their ductless nature, ductless fumehoods are relatively inexpensive to buy and relatively inexpensive to implement, since they do not require the extensive engineering and installation efforts normally associated with ducted fumehoods. Furthermore, installation is very fast, since ductless fumehoods require little more than uncrating and initial setup and testing before use. Ductless fumehoods are also quite energy efficient, since they return the filtered air to the room rather than venting it to the outside atmosphere. As a result, already-heated air is retained in the room during winter and already-cooled air is retained in the room during summer.

Despite the significant advantages associated with ductless fumehoods, current ductless fumehoods have nonetheless encountered certain resistance in the marketplace. This is generally due to concerns about the risk of failure in the filtration system. More particularly, while conventional ductless fumehoods generally have their outlet fan 40 and sensor 45 connected to an alarm 50 which can alert the operator if outlet fan 40 and/or sensor 45 should fail, they still require that the operator be in the general vicinity of the ductless fumehood and that the operator be somewhat attentive. This can be of concern when the ductless fumehood is located in a loud and/or otherwise distracting environment, and/or when placed in the hands of poorly trained and/or unreliable personnel. Furthermore, this can present an administrative problem when the ductless fumehoods are deployed in large numbers and dispersed throughout several laboratories. Due to these concerns and inconveniences, some safety organizations have advised against the use of ductless fumehoods even though ductless fumehoods can offer significant advantages in the areas of technical effectiveness, low acquisition and implementation costs, rapid installation, and substantial energy savings.

In addition to the foregoing, current ductless fumehoods are not modular. As a result, when a new fumehood model with a different filter capacity must be produced, manufacturers must fabricate a new filtration system and all of its command and control elements. Thus, manufacturers must provide filtration systems in a variety of capacities and dimensions, which multiplies both the number of different fumehood models which must be manufactured as well as their associated manufacturing costs. Furthermore, the administrative burden associated with managing a large number of these ductless fumehoods can be enormous. As an illustration of this problem, consider the example of trains without cars, made up only of locomotives, with each locomotive having a different seating capacity. The cost of manufacturing large numbers of different models, and the administrative burdens associated with managing a fleet of such trains, made up of countless different models, can be prohibitive. The situation is currently somewhat analogous for the manufacturers and users of conventional ductless fumehoods.

SUMMARY OF THE INVENTION

These and other problems associated with conventional ductless fumehoods are addressed by the present invention, which comprises a unique ductless fumehood system comprising at least one ductless fumehood and a remote monitor unit, wherein the at least one ductless fumehood is connected to the remote monitor unit through a communication link, such that the remote monitor unit can monitor one or more ductless fumehoods from a central location and provide alerts to an operator located at the ductless fumehood, or to others located at another location, when a failure is detected at a ductless fumehood.

In one form of the present invention, there is provided a ductless fumehood system, the system comprising:

at least one ductless fumehood, the ductless fumehood comprising:

a housing;

a workspace formed within the housing;

a door for selectively closing off the workspace;

an air inlet for introducing air into the workspace;

a master module for receiving air from the workspace, purging unwanted substances from that air, and then exhausting that filtered air to the ambient room atmosphere, wherein the master module comprises:

a master module filter;

a master module filter sensor for determining proper functioning of the master module filter;

a master module exhaust fan for moving air from the workspace, through the master module filter and out into the ambient room atmosphere;

a master module alarm for alerting an operator of a function failure within the ductless fumehood; and a master module central processing unit for (i) controlling the operation of the active elements of the master module, (ii) detecting a function failure of the master module, and (iii) activating the master module alarm in the event of a failure within the master module; and at least one slave module for receiving air from the workspace, purging unwanted substances from that air, and then exhausting that filtered air to the ambient room atmosphere, wherein the slave module comprises:

a slave module filter;

a slave module filter sensor for determining proper functioning of the slave module filter;

a slave module exhaust fan for moving air from the workspace, through the slave module filter and out into the ambient room atmosphere;

wherein the at least one slave module is in communication with the master module such that the master module central processing unit is capable of (i) controlling the operation of the active elements of the slave module, (ii) detecting a function failure of the slave module, and (iii) activating the master module alarm in the event of a failure within that slave module.

In another form of the present invention, there is provided a ductless fumehood system comprising:

at least one ductless fumehood for purging hazardous substances from a workspace located within the ductless fumehood; and a remote monitor unit for receiving information from the at least one ductless fumehood and issuing an alert upon the occurrence of a pre-determined condition at the at least one ductless fumehood.

In another form of the present invention, there is provided a ductless fumehood system comprising a ductless fumehood comprising:

a housing;

a workspace formed within the housing;

a door for selectively closing off the workspace;

an air inlet for introducing air into the workspace;

an air outlet for removing air from the workspace;

a filter system for receiving air from the air outlet, purging unwanted substances from that air, and then exhausting that filtered air to the ambient room air;

an alarm;

a sensor for monitoring operation of the filter system;

a sensor for monitoring function of the air outlet;

a sensor for monitoring door closure; and a sensor monitoring ambient room air; and a central processing unit for receiving data from the filter sensor, the air outlet sensor, the door closure sensor and the ambient room air sensor.

In another form of the present invention, there is provided a ductless fumehood comprising:

a housing;

a workspace formed within the housing;

a door for selectively closing off the workspace;

an air inlet for introducing air into the workspace;

a master module for receiving air from the workspace, purging unwanted substances from that air, and then exhausting that filtered air to the ambient room atmosphere;

at least one slave module for receiving air from the workspace, purging unwanted substances from that air, and then exhausting that filtered air to the ambient room atmosphere;

wherein each of the at least one slave modules communicates with the master module so that the master module can control operation of, and detect failures within, each of the slave modules.

In another form of the present invention, there is provided a ductless fumehood system, the system comprising:

at least one ductless fumehood, the ductless fumehood comprising:

a housing;

a workspace formed within the housing;

a door for selectively closing off the workspace;

a master module for receiving ambient room air, purging unwanted substances from that air, and then passing that filtered air to the workspace, wherein the master module comprises:

a master module filter;

a master module filter sensor for determining proper functioning of the master module filter;

a master module fan for moving air from the ambient room atmosphere, through the master module filter and into the workspace;

a master module alarm for alerting an operator of a function failure within the ductless fumehood; and a master module central processing unit for (i) controlling the operation of the active elements of the master module, (ii) detecting a function failure of the master module, and (iii) activating the master module alarm in the event of a failure within the master module; and at least one slave module for receiving ambient room air, purging unwanted substances from that air, and then passing that filtered air to the workspace, wherein the slave module comprises:

a slave module filter;

a slave module filter sensor for determining proper functioning of the slave module filter;

a slave module fan for moving air from the ambient room atmosphere, through the slave module filter and into the workspace;

wherein the at least one slave module is in communication with the master module such that the master module central processing unit is capable of (i) controlling the operation of the active elements of the slave module, (ii) detecting a function failure of the slave module, and (iii) activating the master module alarm in the event of a failure within that slave module.

In another form of the present invention, there is provided a ductless fumehood system, the system comprising:

at least one ductless fumehood for isolating a workspace located within the ductless fumehood from hazardous substances in the ambient room atmosphere; and a remote monitor unit for receiving information from the at least one ductless fumehood and issuing an alert upon the occurrence of a pre-determined condition at the at least one ductless fumehood.

In another form of the present invention, there is provided a ductless fumehood comprising:

a housing;

a workspace formed within the housing;

a door for selectively closing off the workspace;

an air inlet for introducing air into the ductless fumehood;

an air outlet for removing air from the ductless fumehood;

a filter system for receiving air from the air inlet, purging unwanted substances from that air, and then exhausting that filtered air to the workspace;

an alarm;

a sensor for monitoring operation of the filter system;

a sensor for monitoring function of the air outlet;

a sensor for monitoring door closure;

a sensor monitoring ambient room air; and a central processing unit for receiving data from the filter sensor, the air outlet sensor, the door closure sensor and the ambient room air sensor.

In another form of the present invention, there is provided a ductless fumehood comprising:

a housing;

a workspace formed within the housing;

a door for selectively closing off the workspace;

an air inlet for introducing air into the ductless fumehood;

a master module for receiving air from the ambient room atmosphere, purging unwanted substances from that air, and then passing that filtered air to the workspace;

at least one slave module for receiving air from the ambient room atmosphere, purging unwanted substances from that air, and then passing that filtered air to the workspace;

wherein each of the at least one slave modules communicates with the master module so that the master module can control operation of, and detect failures within, each of the slave modules.

BRIEF DESCRIPTION OF THE DRAWINGS

These and other objects and features of the present invention will be more fully disclosed or rendered obvious by the following detailed description of the preferred embodiments of the present invention, which are to be considered together with the accompanying drawings wherein like numbers refer to like parts and further wherein:

FIGS. 4 and 5 are an exemplary validation questionnaire for determining the appropriate filter to be used for a given chemical;

FIG. 6 is an exemplary listing showing the appropriate filter to be used for a given chemical;

DETAILED DESCRIPTION OF THE PREFERRED EMBODIMENTS

Figure 2:
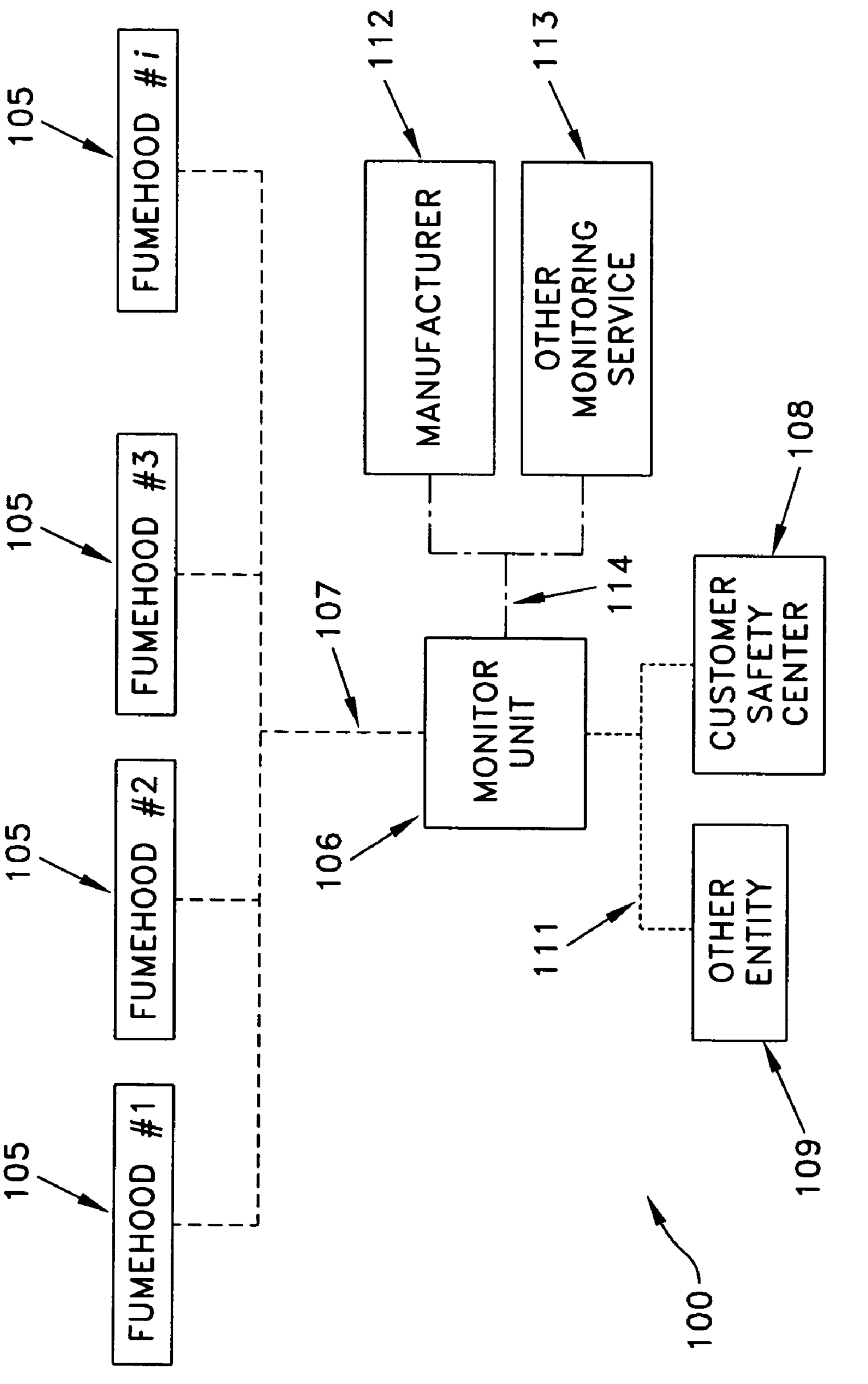
FIG. 2 is a schematic view showing a novel ductless fumehood system formed in accordance with the present invention.

Looking next at FIG. 2, there is shown a ductless fumehood system 100 formed in accordance with the present invention. Ductless fumehood system 100 generally comprises at least one, and preferably a plurality of, ductless fumehoods 105, and a remote monitor unit 106, wherein ductless fumehoods 105 are connected to remote monitor unit 106 through a communication link 107, such that remote monitor unit 106 can monitor ductless fumehoods 105 from a central location and provide alerts to an operator located at a ductless fumehood when a failure is detected at that ductless fumehood. Communication link 107 may be a "hard-wired" connection (e.g., electrical wire or optical fiber) or a "wireless" connection (e.g., an RF link or a cellular telephone link). Furthermore, communication link 107 may utilize a conventional or proprietary protocol. By way of example but not limitation, communication link 107 may comprise a WIFI connection.

Additionally, remote monitor unit 106 may also be connected to a customer safety center 108 and/or other entity 109 (e.g., a local fire department) via a communication link 111, in order to provide alerts to those parties when a failure is detected at that ductless fumehood. Communication link 111 may be a "hard-wired" connection (e.g., electrical wire or optical fiber) or a "wireless" connection (e.g., an RF link or a cellular telephone link). Furthermore, communication link 111 may utilize a conventional or proprietary protocol. By way of example but not limitation, communication link 111 may comprise an Ethernet connection.

Furthermore, remote monitor unit 106 may also be connected to the system's manufacturer 112 and/or to an other monitoring service 113 via a communication link 114, in order to provide alerts to those parties when a failure is detected at that ductless fumehood. Communication link 114 may be a "hard-wired" connection (e.g., electrical wire or optical fiber) or a "wireless" connection (e.g., an RF link or a cellular telephone link). Furthermore, communication link 114 may utilize a conventional or proprietary protocol. By way of example but not limitation, communication link 114 may comprise a conventional telephone connection.

Figure 1:
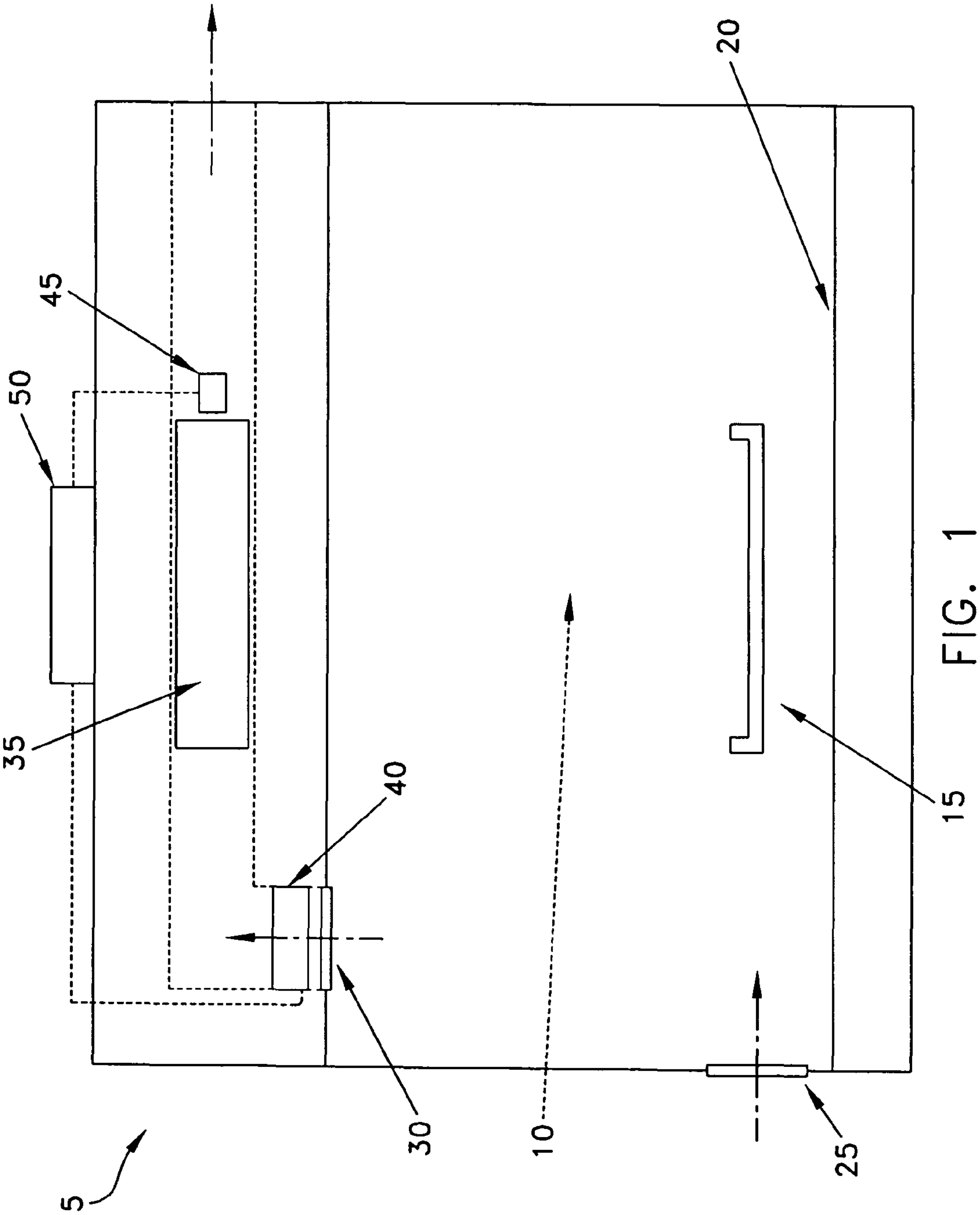
FIG. 1 (PRIOR ART)
FIG. 1 is a schematic view showing a prior art ductless fumehood.
Figure 3:
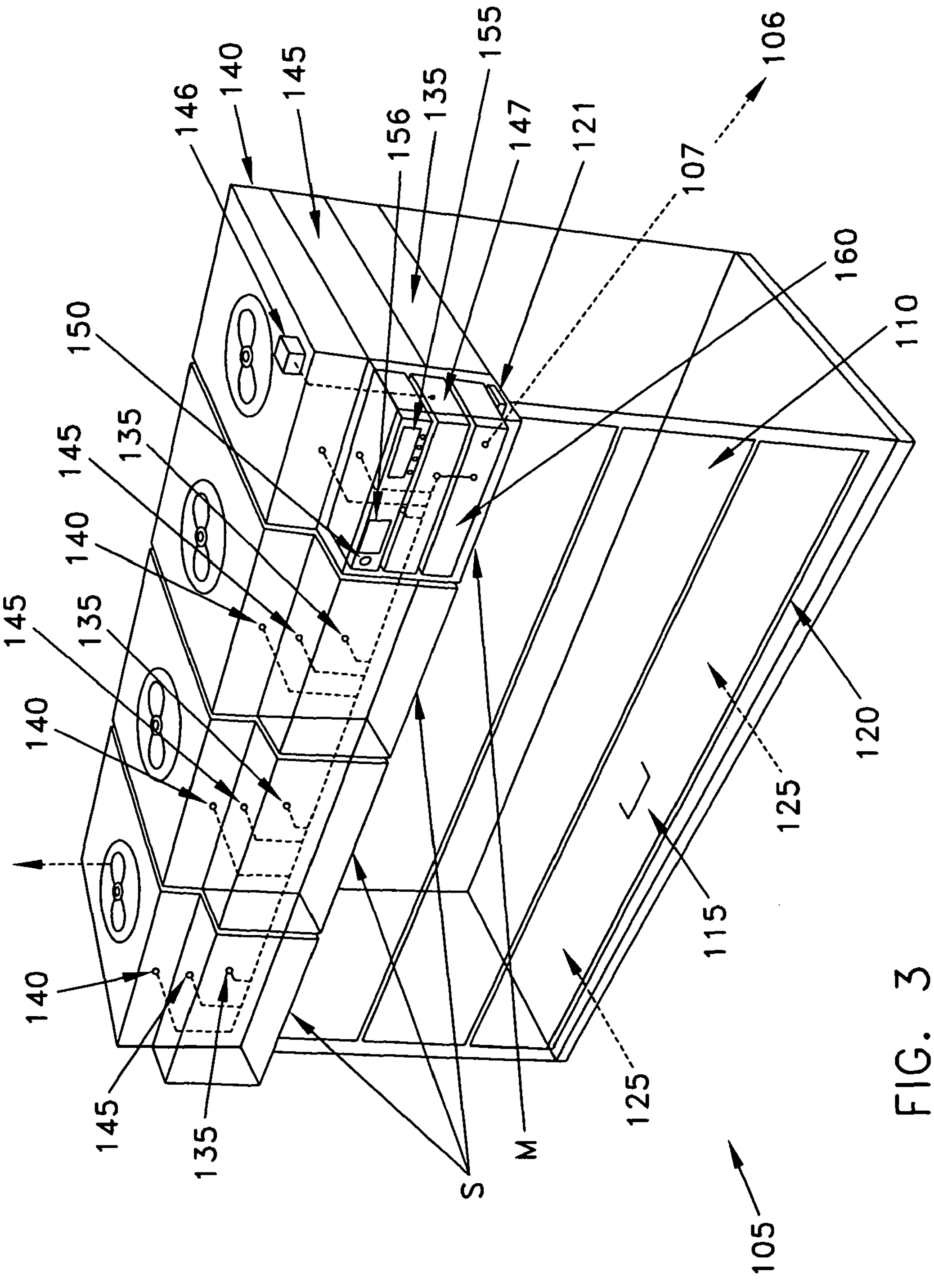
FIG. 3 is a schematic view of a novel ductless fumehood formed in accordance with the present invention.

More particularly, and looking now at FIG. 3, there is shown a novel ductless fumehood 105. Ductless fumehood 105 generally comprises an enclosed workspace 110 accessed by a front door 115, with front door 115 engaging a sash 120 when the enclosed workspace is "sealed". An air inlet 125 admits ambient air into enclosed workspace 110. Air inlet 125 may be a side wall opening similar to the air inlet 25 shown in FIG. 1; more preferably, however, air inlet 125 may comprise one or more gaps formed between the base of front door 115 and the top of sash 120 when front door 115 is in its fully closed position.

Each ductless fumehood 105 also comprises a master module M and, optionally, one or more slave modules S for providing air filtration functions. Master module M also provides control and monitoring functions as will hereinafter be discussed in detail. By way of example but not limitation, the ductless fumehood shown in FIG. 3 comprises one master module M and three slave modules S.

As noted above, master module M provides air filtration functions. To this end, master module M draws air out of workspace 110 and passes that air through a filter before the air is released to the ambient air (e.g., the room air within a laboratory). More particularly, master module M includes, among other things, a filter 135 for removing hazardous substances from the air as the air is drawn through master module M, thereby rendering the air safe before it is vented to the ambient air. In this respect it will be appreciated that the filter media used in filter 135 may vary in accordance with the specific substance which is to removed from the air, e.g., for many applications, filter 135 may comprise activated carbon granules captivated between a pair of screens. An outlet fan 140 is provided so as to draw air from the enclosed workspace 110 through filter 135 before being vented to the atmosphere. A filter sensor 145 is provided at the outlet of filter 135 so as to ensure that the filter purges any hazardous substances from the workspace air before that air is vented to the ambient air. An ambient air sensor 146 is mounted to the exterior of master module M to monitor the ambient air in the vicinity of ductless fumehood 105. Master module M also comprises a sash monitor 121 to confirm when front door 115 is in its closed (i.e., sealed) position against sash 120.

In accordance with the present invention, master module M also comprises a central processing unit 147. It will be appreciated that central processing unit 147 comprises appropriate electronics and software in order that central processing unit 147 may control operation of the active elements of master module M, detect any failures of the components of master module M, and also function in the manner hereinafter described. Central processing unit 147 is connected to the aforementioned sash monitor 121, outlet fan 140, filter sensor 145 and ambient air sensor 146.

Central processing unit 147 is also connected to an alarm 150 which can alert the operator in the event that there is a system failure, and central processing unit 147 is connected to a display monitor 155 (e.g., a touchscreen display, or other user interface such as a computer monitor and keyboard, etc.) in order that the operator may interface with central processing unit 147. Central processing unit 147 is also connected to a communication interface 160 which is connected to the aforementioned communication link 107, whereby central processing unit 147 may communicate with remote monitor unit 106.

By virtue of the foregoing construction, central processing unit 147 is able to detect when there is a system failure. More particularly, central processing unit 147 is capable of detecting when front door 115 is open (by virtue of sash monitor 121), and/or if outlet fan 140 has failed and/or if filter 135 is not operating properly (by virtue of filter sensor 145). When such a system failure is detected, central processing unit 147 activates alarm 150 (and may flash an alert on display monitor 155) so as to alert the operator. At the same time, central processing unit 147 also alerts remote monitor unit 106 via communication link 107. Remote monitor unit 106 can then alert customer safety center 108 (FIG. 2) and/or some other entity 109 via communication link 111, as well as alert manufacturer 112 or some other monitoring service 113 via communication link 114. Thus, failures in any of the ductless fumehoods 105 can be monitored remotely via remote monitor unit 106, thereby making it practical and convenient to operate large numbers of ductless fumehoods 105 in a safe and reliable manner.

Furthermore, inasmuch as central processing unit 147 is connected to ambient air sensor 146, the system is also capable of monitoring ambient air conditions in the vicinity of each ductless fumehood 105. Thus, the system also provides a means for detecting the presence of hazardous substances in the air around each ductless fumehood 105. Significantly, the system is capable of detecting the presence of hazardous substances which may emanate from sources other than the ductless fumehood itself, e.g., the hazardous substances may emanate from a chemical spill elsewhere in the laboratory.

Furthermore, inasmuch as each master module M includes both a filter sensor 145 and an ambient sensor 146, the system is capable of differentiating a global hazard from a local hazard. More particularly, when filter sensor 145 is detecting the presence of a hazardous substance and ambient sensor 146 is not, the hazard is likely to be associated with a local filter failure. However, when filter sensor 145 is not detecting the presence of a hazardous substance and ambient sensor 146 is, the hazard is likely to be associated with a global hazard event.

In addition to the foregoing, central processing units 147, remote monitor unit 106, and/or any of the other entities (e.g., customer safety center 108, other entity 109, manufacturer 112, and/or other monitoring service 113) may keep a log of system operation. Logged events may include system failures, filter replacements, door openings, responsiveness of operators to alerts, etc.

As noted above, each ductless fumehood 105 may also comprise one or more slave modules S (FIG. 3). Slave modules S also provide air filtration functions. To this end, each slave module S comprises a filter 135, a filter sensor 145 and an outlet fan 140. Outlet fan 140 draws air from workspace 110 up through filter 135 before venting the filtered air into the ambient room atmosphere. Filter sensor 145 monitors the function of filter 135. Thus, each slave module S is capable of purging unwanted substances from the air within workspace 110 before venting that air into the ambient room atmosphere. Significantly, each slave module S in ductless fumehood 105 is electrically connected to the master module M provided for that ductless fumehood, in order that central processing unit 147 can control operation of the active elements of each slave module S and detect any failures in any of the components (e.g., filter sensor 145 or outlet fan 140.) of any of the slave modules S.

Thus it will be seen that each ductless fumehood 105 includes an enclosed workspace 110 and a master module M, and may include one or more slave modules S. In fact, each ductless fumehood 105 includes as many slave modules S as are necessary to provide, in conjunction with the air filtering capacity already provided by that fumehood's master module M, the appropriate filter capacity for workspace 110. Thus, for a ductless fumehood 105 having a length X, one master module M and no slave modules S might be provided; for a ductless fumehood 105 having a length (X+Y), one master module M and one slave module S might be provided (FIG. 8); for a ductless fumehood 105 having a length (X+Y+Z), one master module M and three slave modules S might be provided (FIG. 3). In essence, any desired filter capacity can be provided for any ductless fumehood, simply providing one master module M and as many slave modules S as may be needed.

Thus, it will be seen that manufacturing, inventory and service requirements are dramatically reduced through use of the present invention, since only two types of air filtering modules (i.e., master modules M and slave modules S) need be manufactured, inventoried and serviced, regardless of the size ductless fumehoods which are to be produced. In fact, in this respect it should be appreciated that slave modules S are in essence a simplified form of master module M, since they include the air filtering components (e.g., filter 135, filter sensor 145 and outlet fan 140) but omit the control and communication components (e.g., central processing unit 147, communications interface 160, etc.). Or viewed another way, the master module M is essentially an enhanced form of slave module S, since the master module includes components in addition to those provided in a slave module S (e.g., the control and communication components). As a result, slave modules S and master modules M share many common elements, thereby further simplifying manufacturing, inventory and service requirements, and hence further reducing cost. In fact, before receiving the components that differentiate the master modules M from the slave modules S, the modules are identical to one another, and therefore can be manufactured in high volumes, which provides a substantial economic advantage.

Central processing unit 147 may also, in conjunction with other appropriate hardware, provide additional functionality to the ductless fumehood 105. This functionality may include, but is not limited to:

(i) the provision of an audio-visual video program displayed on an appropriately-sized display monitor 155—the program could be a live or pre-recorded audio-visual feed designed to provide a user with relevant information—by way of example but not limitation, the program could be intended to provide students with remote access to experiments performed within another ductless fumehood by a professor, or the program might intended to provide students with a step-by-step procedure for conducting an experiment; and/or (ii) the provision of a database identifying those chemicals for which operation of the ductless fumehood is approved; and/or (iii) a sensor detecting the presence or absence of filters in the ductless fumehood; and/or (iv) a bar code reader allowing the fast and accurate identification of chemicals which will be used within the fumehood—the bar code reader allows universal product codes (UPC) to be read from the labels on the chemical containers, etc.

Central processing unit 147 is preferably also programmed to manage, in an interactive manner, each of the functions of each of the modules, in order to ensure that each of the modules remains within its operational limits as determined by the manufacturer.

The central processing unit is preferably configured in such a way that it transfers all of the data gathered for its associated ductless fumehood to the communications interface 160, for subsequent transfer to remote monitor unit 106.

The information emitted by each or all of the ductless fumehoods 105 is then preferably gathered by an appropriate wireless transmitter/receiver placed within a computer separate from each or all of the ductless filtering fume hoods (i.e., remote monitor unit 106). This computer is programmed to interactively manage the information coming from each or all of the ductless fumehoods. This information can be placed at the disposal of the person or persons in charge of safety so as to permit them to remotely manage one or all of the ductless fumehoods in order to ensure proper functioning or maintenance. In other words, remote monitor unit 106 can report to customer safety center 108, and/or an other entity 109, and/or manufacturer 112 and/or other monitoring service 113.

With this arrangement it is possible to send the information gathered by the system at one or all of the ductless fumehoods, via the Internet or other communication link, to another location, in order to be managed by another entity, for example, a service and control department of the manufacturer.

Figure 5:
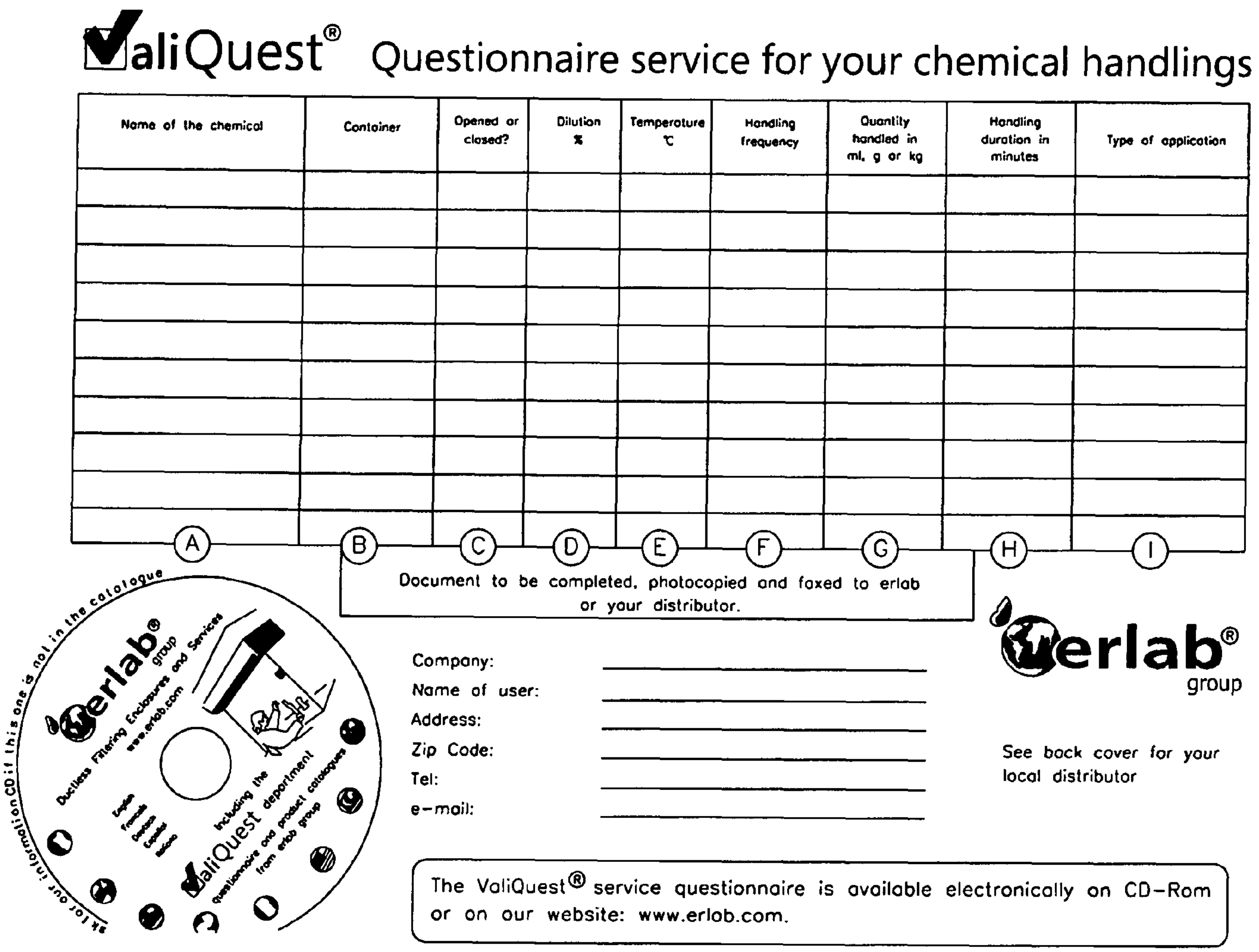

In one preferred form of the present invention, prior to purchasing the ductless fumehoods, a questionnaire (see FIGS. 4 and 5) is provided to the user who, in turn, indicates the chemicals that he/she intends to use within the ductless fumehood. Upon receipt of this data, the manufacturer validates the use of the ductless fumehood for the intended chemicals (see FIG. 6).

Figure 7:
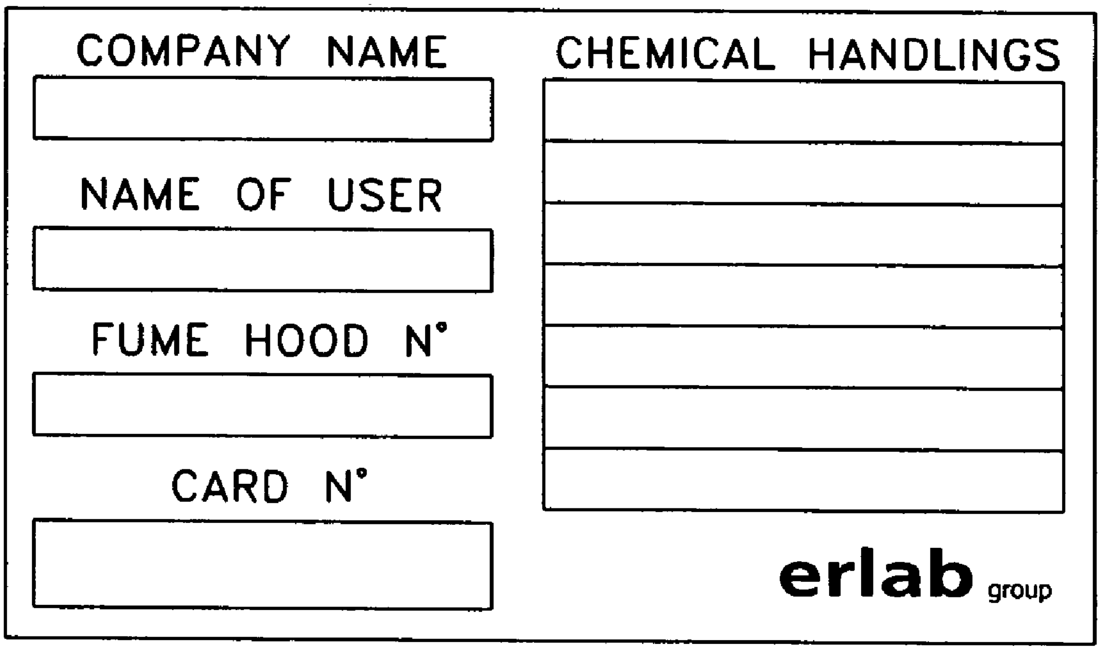
FIG. 7 is a schematic view showing an exemplary magnetic card for identification and for activation of a fumehood.

Preferably, upon receipt of a purchase order from the user, the manufacturer provides an access card (preferably similar to a credit card) on which is recorded various pertinent information, including the chemicals previously validated for use in the fumehood. See FIG. 7. This access card preferably indicates the name of the user who completed the questionnaire, and the access card is used by the user to operate (i.e., turn on or off) the ductless fumehood. In order for this operation to take place, the ductless fumehood is equipped with an electronic card reader 156 (see FIG. 3) for regulating fumehood use. The user inserts an access card into the card reader and the access card will remain there during use of the ductless fumehood. Removing the access card turns off the ductless fumehood. Furthermore, the access card provides a means for limiting use of the fumehood to authorized users.

Figure 8:
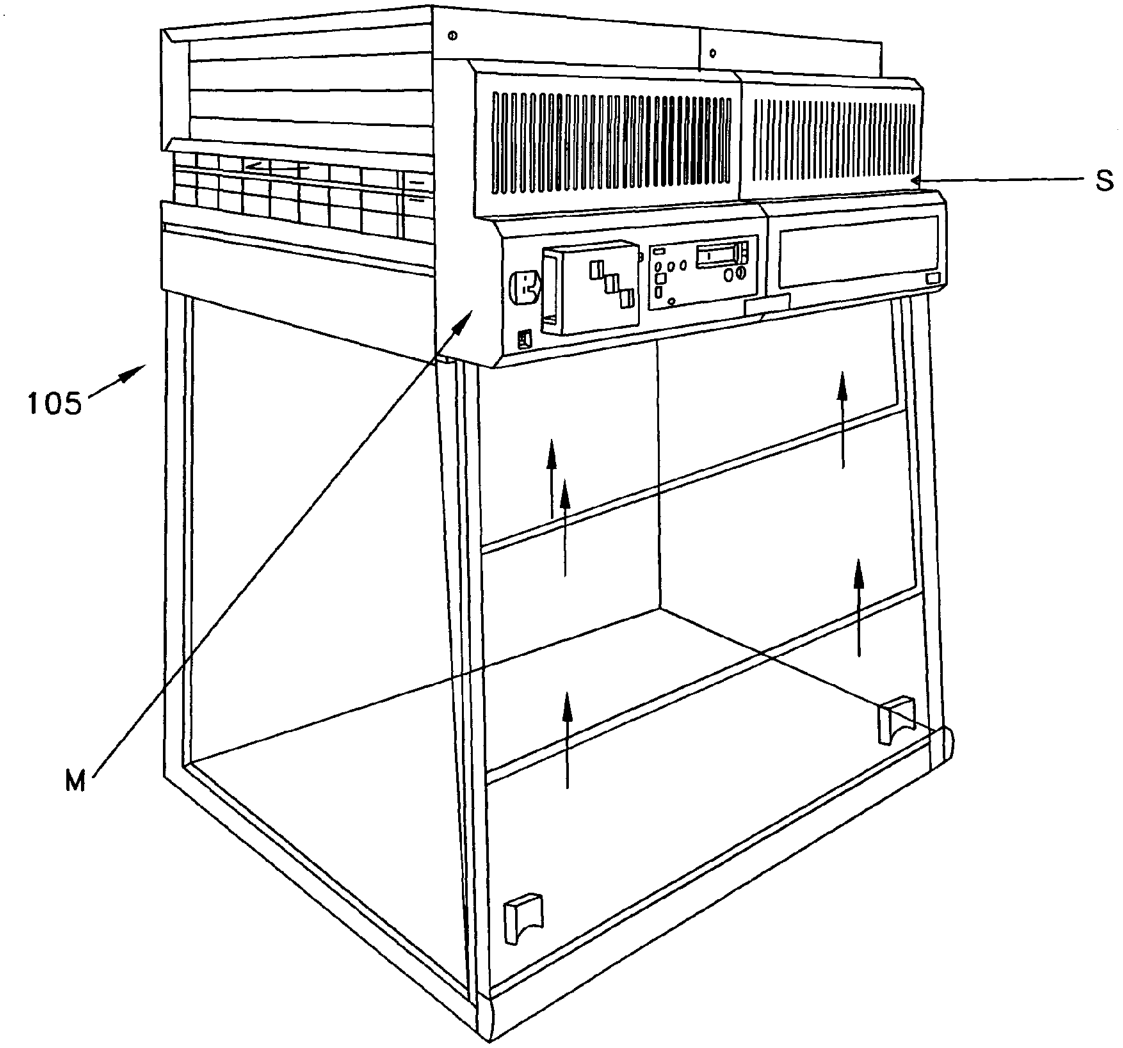
FIG. 8 is a schematic view showing a novel fumehood incorporating a master module and one slave module.

FIG. 8 is a schematic view showing a ductless fumehood 105 utilizing one master module M and one slave module S.

Additional Comments Regarding the Invention

Thus it will be seen that, with the present invention, a number of sensors and interactive detectors placed within the ductless filtering fume hood modules are linked to a processor (e.g., a central processing unit) placed within one of the modules (e.g., the master module M) that controls the active elements of all the other modules (e.g., the slave or "dummy" modules S); for example, sensors and detectors are placed within elements such as, but not limited to, fans or blowers, face velocity meters, gas detectors and lighting. This processor also controls the activation of the working modules that constitute the ductless filtering fumehood. In other words, these sensors and detectors are linked to the management processor and to all of the functions (provided or to be provided) of all of the modules that make up the ductless filtering fumehood such as, for example: an audio-visual video system designed to provide students with remote access to experiments performed within the hood by a professor in cases when the ductless filtering fumehood is used in the educational sector, or a database allowing the operation of a chemical listing, or a sensor detecting the presence of filters, or also a bar code reader allowing the identification of chemical molecules from the bottles that contain them, etc. The electronic processor is programmed to manage in an interactive manner each of the functions of the modules so that they react and act upon the elements of the modules of the ductless filtering fumehood in order to maintain within their limits the settings determined by the manufacturer.

This central processing unit is configured in such a way that it transfers all of the gathered information towards an electronic board placed within the main or master module M that reads the information and also transfers this information towards a remote transmitting and receiving wireless system also placed within the master module M.

The information emitted by each or all of the ductless filtering fumehoods is then gathered by an appropriate wireless transmitter receiver placed within a computer separate from each or all of the ductless filtering fumehoods. This computer is equipped with a program specially designed by the manufacturer of the ductless filtering fumehood to interactively manage each or all of the information coming from each or all of the ductless filtering fumehoods. This construction can be placed at the disposal of the person or people in charge of safety so as to permit them to remotely manage one or all ductless filtering fumehoods in order to insure proper functioning or maintenance.

With this arrangement it will also be possible to send the information gathered by the system of one or all of the ductless filtering fumehoods, via the Internet, in order to be managed by a service and control department of the manufacturer.

The filtration portion of the ductless filtering fumehood is comprised of one or more filtration modules that make up, by multiplication, the length of the hood. For example the modules will preferentially have a length of 40 centimeters or 16 inches. The command or main module M will be linked to the other slave or "dummy" modules S by electrical connectors so that the interactivity of commands or information coming from the central processing unit (found on the command or main module M) can be transferred to the active elements of all the modules. The inconveniences coming from the use of non-modular systems to constitute a multitude of fumehood sizes have been described above. The advantages of using modular systems are therefore clear, specifically in the case of putting together an intercommunication system such as the one described above.

Reversed Airflow

In the preceding discussion, ductless fumehood 105 is discussed in the context of a fumehood designed to protect personnel and the environment from the contents of workspace 110, i.e., filter 135 filters air as that air passes from workspace 110 to the ambient room atmosphere. However, it should also be appreciated that the present invention can be applied to situations where ductless fumehood 105 is designed to protect the contents of workspace 110 from substances in the ambient room air. In this case, outlet fan 140 is reconfigured so that it operates as an inlet fan, i.e., it moves ambient room air into the fumehood through filter 135, so that the ambient room air is filtered before it is moved into workspace 110. Openings in ductless fumehood 105 then permit the air in workspace 110 to pass back into the ambient room atmosphere.

MODIFICATIONS OF THE PREFERRED EMBODIMENTS

It should be understood that many additional changes in the details, operation, steps and arrangements of elements, which have been herein described and illustrated in order to explain the nature of the present invention, may be made by those skilled in the art while still remaining within the principles and scope of the invention.

What is claimed is:

1. A ductless fumehood system comprising:
at least one ductless fumehood, the ductless fumehood comprising:
a housing;
a workspace disposed within the housing;
a door for selectively closing off the workspace;
an air inlet for introducing air from an ambient atmosphere into the workspace;
a master module disposed in said housing for receiving air from the workspace, filtering unwanted substances from the air, and exhausting filtered air to the ambient atmosphere, wherein the master module comprises:
a master module filter;
a master module filter sensor for determining functioning of the master module filter;
a master module exhaust fan for moving air from the workspace, through the master module filter and out into the ambient atmosphere;
a master module alarm for alerting an operator of a failure within the ductless fumehood; and
a master module central processing unit for (i) controlling operation of active elements of the master module, (ii) detecting a failure of the master module, and (iii) activating the master module alarm in the event of a failure within the master module; and
at least one slave module disposed in said housing for receiving air from the workspace, filtering unwanted substances from the air, and exhausting filtered air to the ambient atmosphere, wherein the slave module comprises:
a slave module filter;
a slave module filter sensor for determining functioning of the slave module filter;
a slave module exhaust fan for moving air from the workspace, through the slave module filter and out into the ambient atmosphere;
wherein the at least one slave module is in communication with the master module such that the master module central processing unit is capable of (i) controlling operation of active elements of the slave module, (ii) detecting a failure of the slave module, and (iii) activating the master module alarm in the event of a failure within the slave module.

2. A system according to claim 1 wherein the at least one ductless fumehood further comprises:
a sensor for monitoring door closure; and
a sensor for monitoring ambient room air.

3. A system according to claim 1 wherein the at least one ductless fumehood further comprises a communication module for enabling communication between the master module central processing unit and a remote monitor unit.

4. A system according to claim 3 wherein the system comprises a plurality of ductless fumehoods, wherein each of the ductless fumehoods further comprises a communication module for enabling communication between the fumehood's master module central processing unit and the remote monitor unit.

5. A system according to claim 1 wherein the at least one ductless fumehood further comprises:
an air outlet for removing air from the workspace; and
a filter system comprising said master module filter and slave module filter for receiving air from the air outlet, filtering unwanted substances from the air, and exhausting the filtered air to the ambient air.

6. A system according to claim 5 wherein the at least one ductless fumehood further comprises:
a sensor for monitoring operation of the filter system;
a sensor for monitoring function of the air outlet;
a sensor for monitoring door closure; and
a sensor for monitoring ambient room air.

7. A system according to claim 6 wherein the master module central processing unit is adapted for receiving data from the filter system sensor, the air outlet sensor, the door closure sensor and the ambient room air sensor.

8. A system according to claim 7 wherein the at least one ductless fumehood further comprises a touchscreen display monitor for facilitating communication between the central processing unit and a user.

9. A system according to claim 1 wherein the at least one ductless fumehood further comprises a card reader, and the at least one ductless fumehood is enabled only when an access card is introduced to the card reader and found by the card reader to be appropriate.

10. A system according to claim 5 wherein the filter system comprises a plurality of modular filter units.

11. A system according to claim 1 wherein the system comprises a plurality of ductless fumehoods.

12. A system according to claim 1,
wherein the system further comprises a remote monitor unit for receiving information from the at least one ductless fumehood and issuing an alert upon the occurrence of a pre-determined condition at the at least one ductless fumehood; and
wherein the at least one ductless fumehood further comprises a communication module for enabling communication between the master module central processing unit and the remote monitor unit.

13. A ductless fumehood system, the system comprising:
at least one ductless fumehood, the ductless fumehood comprising:

a housing;

a workspace formed within the housing;

a door for selectively closing off the workspace;

a master module disposed in said housing for receiving surrounding ambient air, filtering unwanted substances from the received air, and passing filtered air to the workspace, wherein the master module comprises:

a master module filter;

a master module filter sensor for determining functioning of the master module filter;

a master module fan for moving air from the ambient atmosphere, through the master module filter and into the workspace;

a master module alarm for alerting an operator of a function failure within the ductless fumehood; and a master module central processing unit for (i) controlling the operation of active elements of the master module, (ii) detecting a function failure of the master module, and (iii) activating the master module alarm in the event of a failure within the master module; and at least one slave module disposed in said housing for receiving ambient air, filtering unwanted substances from the air, and passing filtered air to the workspace, wherein the slave module comprises:

a slave module filter;

a slave module filter sensor for determining proper functioning of the slave module filter;

a slave module fan for moving air from the ambient atmosphere, through the slave module filter and into the workspace;

wherein the at least one slave module is in communication with the master module such that the master module central processing unit is capable of (i) controlling the operation of active elements of the slave module, (ii) detecting a function failure of the slave module, and (iii) activating the master module alarm in the event of a failure within the slave module.

14. The fumehood system in accordance with claim 1, wherein the master module and slave module are each adapted to retain at least one filter, the filter being adapted to filter out a selected unwanted substance.

15. The fumehood system in accordance with claim 1 wherein the system comprises a plurality of like fumehoods.

16. The fumehood system in accordance with claim 1 wherein the number of slave modules disposed in the workplace is limited only by a selected size of the housing.

* * * * *